United States Patent [19]

Emmel

[11] 4,321,425

[45] Mar. 23, 1982

[54] LATTICE CABLE AND COMPOSITE DIELECTRIC TRANSMISSION LINE AND METHOD OF MAKING SAME

[76] Inventor: Leroy L. Emmel, 1800 Wallace Ave., Apt. R, Costa Mesa, Calif. 92627

[21] Appl. No.: 8,552

[22] Filed: Feb. 2, 1979

[51] Int. Cl.[3] ........................ B32B 15/08; H01B 7/08; H01B 9/00

[52] U.S. Cl. ........................................ 174/32; 156/47; 156/51; 156/178; 156/179; 156/311; 156/322; 174/117 F; 174/117 AS; 264/259; 264/261; 264/280; 264/320; 264/272.15

[58] Field of Search ..................... 156/47, 51, 55, 179, 156/245, 311, 320, 322, 581, 582, 583.1, 178; 264/259, 261, 271, 280, 320; 174/27, 32, 117 F, 117 AS, 174

[56] References Cited

U.S. PATENT DOCUMENTS

| | | | |
|---|---|---|---|
| 2,610,607 | 9/1952 | Isenberg | 156/51 X |
| 2,789,926 | 4/1957 | Finholt et al. | 156/51 X |
| 3,208,898 | 9/1965 | Chavannes et al. | 156/582 X |
| 3,802,974 | 4/1974 | Emmel | 156/55 |
| 4,043,851 | 8/1977 | Holladay et al. | 156/47 |
| 4,097,324 | 6/1978 | Emmel | 156/51 X |

*Primary Examiner*—James C. Cannon

[57] ABSTRACT

There is disclosed a lattice cable and a method of making said, said lattice cable having a plurality of elongated insulated elements extending parallel to one another and uniformly spaced apart by integrally formed insulative ribs there between, the elongated insulative elements and the insulative ribs being constructed of a material having a first dielectric constant. At least every other one of the elongated insulative elements having an elongated electrical conductor partially embedded in the surface thereof so that a portion of the surface of the elongated electrical conductor is exposed along the length thereof, the elongated electrical conductors passing through and being covered by the integrally formed insuative ribs so that the exposed portion of the elongated electrical conductors is located between the insulative ribs. Each lattice cable thus formed may be placed in a layered combination with one or more other lattice cables. Each of the lattice cables or the layered combinations thereof may be encapsulated in a material of a second dielectric constant and the size of the openings between the ribs of the lattice cable may be adjusted such that the encapsulated dielectric material does not enter the openings there between so as to produce a desirable composite dielectric constant for the assembly.

9 Claims, 11 Drawing Figures

LATTICE CABLE AND COMPOSITE DIELECTRIC TRANSMISSION LINE AND METHOD OF MAKING SAME

The method of this invention for making a lattice cable involves the steps of applying heat to a film belt of insulative material; heating a plurality of electrical conductors close to the melting temperature of the film belt; heating a molding roll near to the melting temperature of the film belt; moving the plurality of heated electrical conductors into seated contact with circumferential grooves in the surface of the molding roll and leaving vacant longitudinal grooves in the surface of the molding roll; moving the melted film belt into pressure contact with the molding roll surface; molding the melted film belt into the circumferential grooves containing the electrical conductors and into the longitudinal grooves to produce a continuous lattice cable structure with electrical conductors partially embedded in elongated insulative elements being interconnected at spaced intervals by integrally formed insulative ribs.

The present invention relates to conductor cables which typically comprise a number of longitudinally extended transversely spaced conductor elements embedded in an insulated structure and more particularly to layered transmission lines and composite dielectric constant transmission lines and methods for making the same.

Applicant has described in his U.S. Pat. No. 4,097,324 issued June 27, 1978, and in his divisional application Ser. No. 843,459, now U.S. Pat. No. 4,230,898, a method of making a laminated lattice cable structure, a cable structure having continuously exposed electrical conductors and a transmission cable structure having electrical conductors encapsulated in insulative material having a first dielectric constant which in turn is surrounded by an insulative material of a second dielectric constant.

Although the method for manufacturing laminated lattice cable described in applicant's U.S. Pat. No. 4,097,324 has served the purpose, it is not proved entirely satisfactory under all conditions of manufacture in that it does not allow a flat lattice cable to be fabricated having portions of the conductors embedded therein to be alternately covered and exposed along the lengths thereof. Although a continuously exposed conductor lattice cable can be manufactured according to U.S. Pat. No. 4,097,324 by omitting the insulative laminating cover, it is undesirable to have such continuously exposed conductors in applications where the conductors might become dislodged from the insulative material in which they are embedded or where the exposed conductors may make contact with other exposed conductors by accident.

Lattice cables comprising multiple transmission lines where the electrical conductors lie in the single plane of the flat lattice cable are described in application Ser. No. 843,459, now U.S. Pat. No. 4,230,898. Although such cables have served their purpose, they have not proved entirely satisfactory under all conditions of application for the reason that cross-talk between transmission line pairs increases as the spacing between the conductors decreases when it is attempted to increase the density of the number of transmission lines in a given cable size. This difficulty is overcome by the present invention.

Although multiple transmission line flat cables having electrical conductors embedded in a single insulative material with a uniform dielectric constant which in turn is surrounded by a jacket of another insulative material with a different uniform dielectric constant have been described and used for the purpose of decreasing cross-talk between transmission lines, they have not proved entirely satisfactory under all conditions of service for the reason that the ability of the cable to propagate electrical signals at a high velocity is limited by the combined insulative materials. Since air is the best material to separate electrical conductors for high speed transmission, it has long been one of the design objectives of designers of high frequency flat cable transmission lines to develop a composite insulative material having a dielectric constant that approximates the dielectric constant of air. The present invention accomplishes this objective.

The general purpose of this invention is to provide a lattice cable structure and methods for manufacturing the same which embrace all the advantages of similarly employed flat cables and methods of manufacture and possesses none of the aforedescribed disadvantages. To attain this, the present invention contemplates a unique lattice structure in which elongated conductive elements are partially embedded and which can be surrounded by an insulative jacket having regions of trapped air separating the exposed conductors of the transmission line.

An object of the present invention is the provision of a lattice cable having discrete portions of the electrical conductors therein exposed and uncovered by insulative material.

Another object is to provide several lattice cables having partially exposed electrical conductors therein in a layered structure whereby connective pins may be inserted into the lattice cavities to contact exposed surfaces of the conductors therein.

Still another object is to provide a transmission line in a medium having an effective dielectric constant that approximates the dielectric constant of air.

A still further object is to provide a multiplicity of layers of lattice flat cable joined together by an insulative material which surrounds the cable layers and penetrates the voids in the lattice structure.

Yet another object of the present invention is the provision of a multiple transmission flat cable wherein each of the transmission lines lies in a plane perpendicular to the plane of the cable.

Yet another object of the invention is the provision of a flat multiple transmission line cable wherein the plane of each transmission line is perpendicular to the plane of the cable and wherein each element of each transmission line is separated from its mating element by an air space.

Another object of the present invention is a provision of a manufacturing method for making a lattice flat cable in which each conductive wire is periodically exposed from the insulative material of the lattice.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
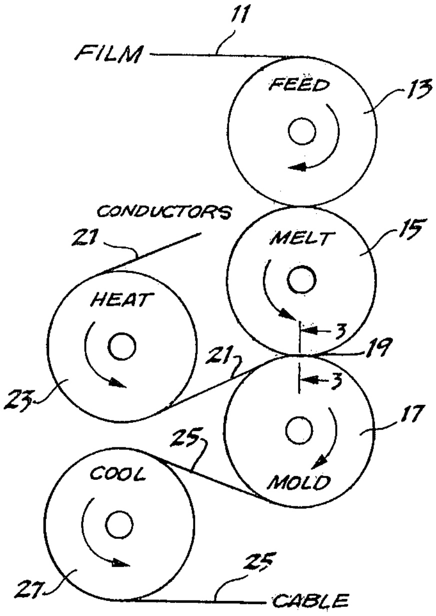
FIG. 1 shows a block diagram of a preferred embodiment of apparatus and a method for the production and manufacture of a unitized lattice cable.
Figure 3A:
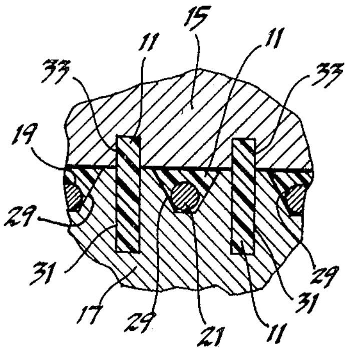
Figure 3B:
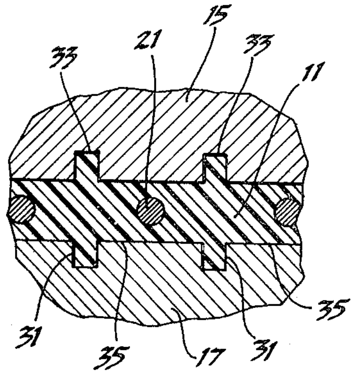
Figure 5A:
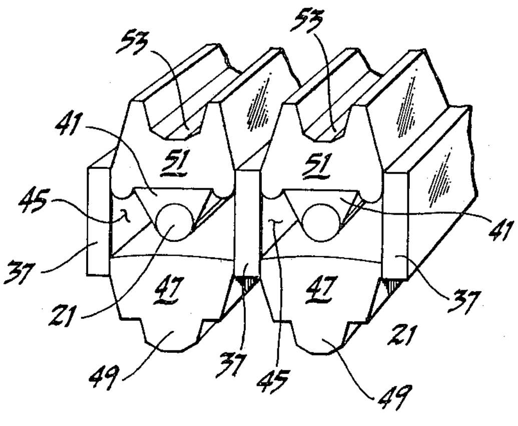
Figure 5B:
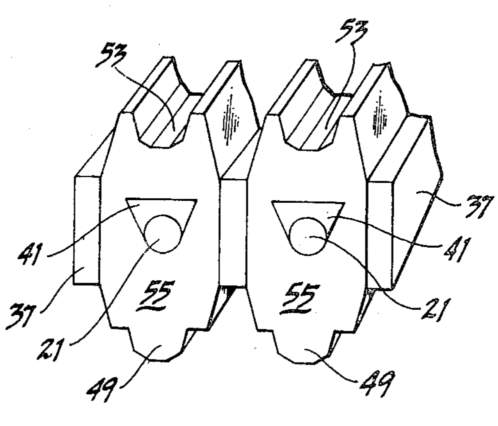
Figure 4:
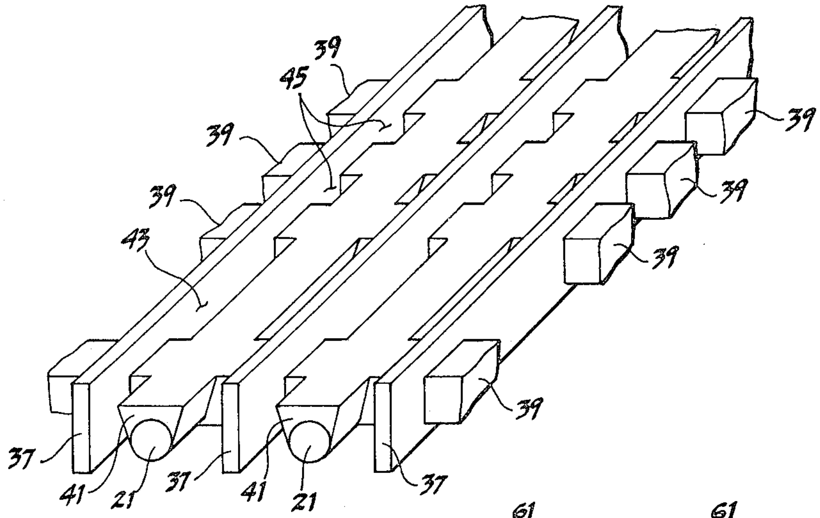
Figure 6:
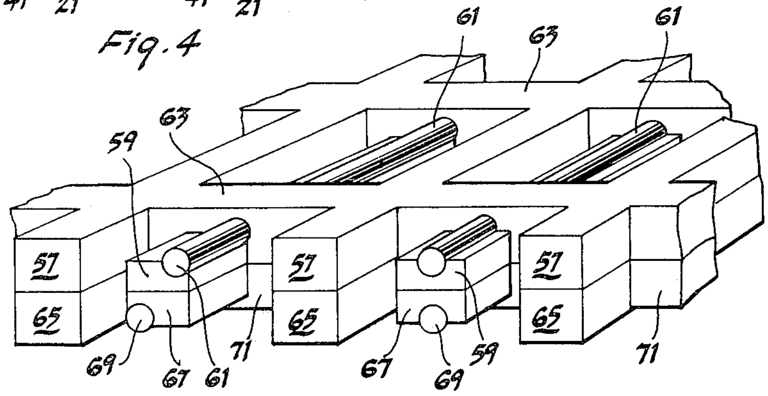
Figure 7:
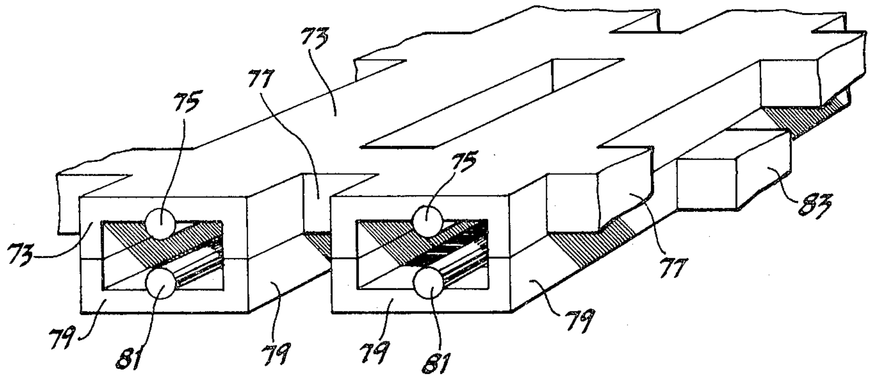
Figure 8:
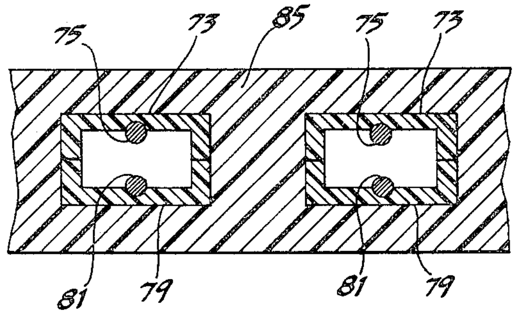

FIGS. 3(*a*) and 3(*b*) show a cross section of a portion of the melt roll and the mold roll at their point of contact taken on the line 3—3 of FIG. 1 looking in the direction of the arrows;

FIG. 4 illustrates a portion of a perspective view of a flat lattice cable produced by the apparatus of FIG. 1;

FIGS. 5(*a*) and 5(*b*) show a portion of a perspective view of the cable of FIG. 4 with an interconnecting jacket partially extending into and fully extending into the lattice voids of the cable;

FIG. 6 illustrates a portion of a perspective view of an alternate form of the cable of FIG. 4 connected in a layered configuration;

FIG. 7 shows a portion of a perspective view of a layered cable configuration having an air gap between conductors; and FIG. 8 illustrates a cross section of the cable of FIG. 7 through a point where there are no cross ribs and which cable is further surrounded by an insulative jacket.

Figure 9:
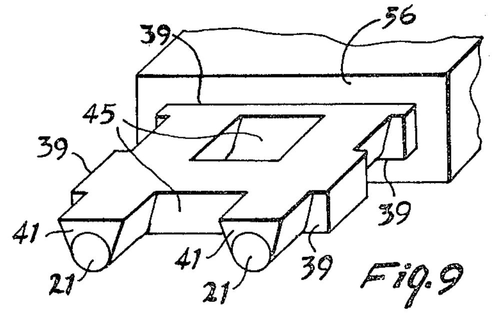

FIG. 9 illustrates a perspective view of yet another alternate form of the cable of FIG. 4–5 comprising a basic 2-conductor transmission line.

Referring now to the drawings, wherein like reference characters designate like or corresponding parts throughout the several views, there is shown in FIG. 1 (which illustrates a preferred method of making lattice cable) an insulative film belt 11 which is frictionally coupled to the cylindrical surface of a feed roll 13 which feed rotates clockwise in the direction of the arrow to feed insulative film belt 11 onto the cylindrical surface of a melt roll 15, which melt roll rotates in the direction of the arrow in a counterclockwise motion. The cylindrical surface of melt roll 15 engages the cylindrical surface of a mold roll 17 to form a nip 19. A plurality of conductors 21 frictionally engage the cylindrical surface of a heat roll 23 and then are directed and seated into grooves (not illustrated) on the cylindrical surface of mold roll 17. The heated wires 21 and melted insulative film 11 enter nip 19 where the conductors are partially embedded into insulative material 11 to form a lattice cable structure 25. Heat roll 23 turns in a counterclockwise direction while mold roll 17 turns in a clockwise direction indicated by the arrows. Lattice cable structure 25 is then engaged by a cool roll 27 to remove heat imparted by the molding process.

Figure 2:
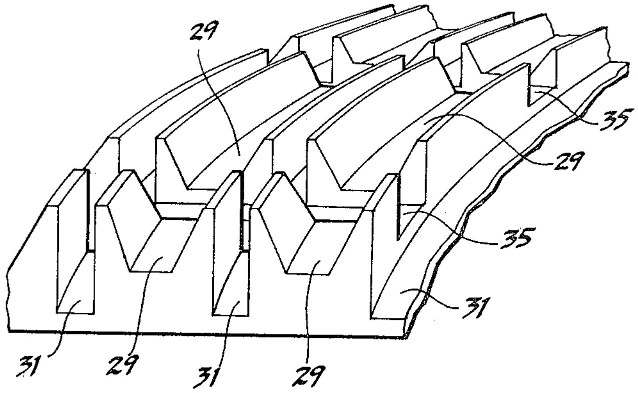
FIG. 2 illustrates a section of the cylindrical surface of the mold roll of FIG. 1.

FIG. 2 shows a perspective view of a section of the cylindrical surface of mold roll 17. A multiplicity of elongated parallel circumferential grooves 29 having sloping surfaces thereon terminating in a flat surface at the bottom of the groove are separated by parallel circumferential grooves 31 which are rectangular in shape and which extend deeper into the surface of mold roll 17 then do grooves 29. At right angles to grooves 29 and 31 are longitudinal grooves 35 which are spaced apart in a predetermined pattern. Longitudinal grooves 35 are rectangular in form and extend deeper into the surface of mold roll 17 than grooves 29, but less than the depth of grooves 31.

FIGS. 3(*a*) and (*b*) illustrate a cross section of a portion of melt roll 15 and mold roll 17 at nip 19. FIG. 3(*a*) is a cross section formed when a portion of mold roll 17 located between grooves 35 contacts melt roll 15, and FIG. 3(*b*) is a cross section formed when a groove 35 is aligned in nip 19.

Turning now to FIG. 3(*a*), melt roll 15 is shown in engagement with mold roll 17 forming nip 19. Conductors 21 are shown seated at the bottom of groove 29 and making contact with the sloping sides thereof. The space between conductor 21 and melt roll 15 is occupied by insulative material 11. Where melt roll 15 and mold roll 17 actually make contact there is no insulative material. Rectangular groove 31 of mold roll 17 mates with a smaller rectangular groove 33 in melt roll 15 to form a rectangular void which is filled by insulative material 11.

In FIG. 3(*b*) the cross section is taken through groove 35 of mold roll 17 extending deeper than grooves 35 and oppositely disposed grooves 33 in melt roll 15. Conductors 21 are completely surrounded and embedded in insulative material 11 at this point.

FIG. 4 illustrates a section of the lattice cable structure formed by the apparatus described in FIGS. 1 through 3. Electrical conductors 21 are shown partially embedded in elongated insulative elements 41 which in turn is integrally connected to ribs 39 which are integrally formed to elongated insulative elements 37. Therefore ribs 39 alternately connect elongated insulative elements 37 with elongated insulative elements 41 containing conductors 21 partially embedded therein. Cross-ribs 39 are spaced apart in a predetermined manner so as to have a long air space 43 between elongated insulative element 41 and elongated insulative element 37 and then several short air spaces 45 there between. The reasons for the short air spaces 45 and the long air spaces 43 will become apparent in connection with the discussion of FIGS. 5(*a*) and (*b*).

FIG. 5(*a*) shows a portion of a perspective view of the cable structure of FIG. 4 having an upper insulative jacket 51 and a lower insulative jacket 47 applied to the upper and lower surfaces of the cable structure between elongated insulative elements 37. The cable structure illustrated in FIG. 5(*a*) is shown cut across a section of the cable which goes through an air space 45. The dimension of air space 45 is selected so that when insulative jackets 47 and 51 are applied to the cable structure that the insulative material of these jacket covers will not flow into the air space 45 because of its small dimension. Therefore air is trapped between insulative jackets 47 and 51 in space 45. Insulative jacket 47 has a ridge 49 extending there along and insulative jacket 51 has a groove 53 extending there along, groove 53 having the exact shape of ridge 49 so as to be capable of mating therewith. Insulative jacket 51 contacts elongated insulative element 41 into which conductor 21 is partially embedded. Insulative jacket 47 extends into air space 45 but is spaced from and not touching electrical conductor 21 thereby providing an air gap and an air space surrounding the exposed portion of conductor 21.

FIG. 5(*b*) illustrates a section of the cable of FIG. 4 with insulative jackets there around. Air space 43 is of a sufficient length so as to allow the insulative jackets 51 and 47 of FIG. 5(*a*) to penetrate and merge to completely fill air space 43 thereby forming an integral jacket 55 around elongated insulative element 41 and conductor 21 partially embedded therein. Insulative jacket 55 has a groove 53 there along similar to groove 53 of insulative jacket 51 and a ridge 49 there along similar to ridge 49 of insulative jacket 47. Therefore, it should be clear that the ridges 49 of insulative jacket 47 of FIG. 5(*a*) may be mated with and engage grooves 53 of insulative jacket 55 of FIG. 5(*b*) to form a multi-layered cable. Cables may be stacked in such a manner in any depth and number as desired.

FIG. 6 illustrates an alternate form of a cable formed by the method in apparatus shown in FIG. 1 connected with a mating lattice cable to form a two-layered lattice cable structure. An elongated insulative element 59 contains a conductor 61 partially embedded in an edge thereof and is integrally attached by ribs 63 to adjacent elongated insulative elements 57 parallel therewith. Similarly, elongated insulative elements 67 have conductors 69 partially embedded there along and are connected to adjacent elongated insulative elements 65 by cross-ribs 71. Elongated insulative elements 59 and 67 may be connected together along their lengths as well as elongated elements 57 and 65 and ribs 63 and 71 to form a two-layered lattice cable. As illustrated in FIG. 6, electrical conductors 61 and 69 may be offset so as to be located along the edge or interior surface of elongated insulative elements 59 and 67 or located on an exterior or outward facing surface of elongated insulative elements 59 and 67. By offsetting conductors 61 and 69 to the corners or interior surfaces of elongated insulative elements 59 and 67, the exposed portion of the conductors is made accessible through the lattice openings from either side of the lattice structure. By locating conductors 61 and 69 centrally in the outward face of insulative elements 59 and 67 respectively, the exposed portion of the conductors is accessible from one side of the lattice structure only. However, if additional layers of bi-layered lattice cable are attached, the centrally located conductors would become buried and not accessible at all. Therefore, by placing the conductors at the corners or interior faces of the elongated insulative elements, the exposed portions of the conductors are always accessible through the lattice structure regardless of the number of layers.

In FIG. 7 there is disclosed another alternate form of a two-layered lattice cable structure in which elongated insulative elements 73 having a cross-section in the form of a "U" shaped channel have electrical conductors 75 centrally located therein, the elements 73 being parallel and spaced apart by ribs 77 integrally formed there between. The channels of elements 73 mate with and connect to oppositely disposed and identical "U" channels of insulative elements 79, the channels having electrical conductors 81 centrally located therein elements 79 being separated and parallel spaced by integrally formed ribs 83 there between. Conductors 75 are partially embedded in channels 73 and fully embedded in ribs 77 and conductors 81 are partially embedded, in channels 79 and fully embedded in ribs 83. Therefore, conductors 75 and 81 are spaced apart by an air gap which is completely enclosed by the mating of the open ends of the channels of elongated insulative elements 73 and 79. This structure forms a multiplicity of transmission lines whose conductors are in a plane perpendicular to the plane of the cable. Ribs 77 and 83 may be offset so that they do not lie opposite one another to allow more flexibility of the cable.

FIG. 8 shows a cross-section of the cable of FIG. 7 taken between ribs 77 and 83 and surrounded by an insulative jacket 85.

FIG. 9 illustrates a perspective view of yet another alternate form of the cable of FIGS. 4–5 with elongated insulative element 37 eliminated, with a basic 2-conductor transmission line construction and having all lattice openings of short length 45. Elements 56 is a surrounding jacket of a second dielectric constant and may not be mechanically joined to the lattice cable through lattice openings.

The method of making the partially embedded conductor lattice cable of the present invention can best be understood by reference to FIGS. 1 through 3. A belt of insulative film 11 is placed into contact with a melt roll 15 where the film belt is heated to a temperature sufficient to soften and melt the insulative material. Mold roll 17 is heated to a temperature that is near the melting temperature of film belt 11. Conductors 21 are heated by heat roll 23 to a temperature which is near the melting temperature of film belt 11. Heated electrical conductors 21 are moved into seated contact with circumferential grooves 29 in the surface of mold roll 17, the electrical conductors bridging the deeper longitudinal grooves 35 in the surface of molding roll 17. Melted film belt 11 is moved into pressure contact with the surface of mold roll 17 to mold the insulative material into circumferential grooves 31, circumferential grooves 29 containing electrical conductors 21 and into the deeper longitudinal grooves 35 to form a series of parallel elongated insulative elements 37 and 41 with at least every other one (element 41) thereof containing an electrical conductor 21 partially exposed therein, the parallel elongated insulative elements 37 and 41 being interconnected at spaced intervals by integrally formed insulative ribs 39 through which electrical conductors 21 pass. The lattice cable structure coming from mold roll 17 is cooled by passing it over cool roll 27 where the heat is removed from the lattice structure and the insulative material is solidified and stabilized. Cooling roll 27 has identical circumferential grooves and longitudinal grooves to those formed in the surface of mold roll 17.

Although the cable structure illustrated in FIG. 4 alternately shows elongated insulative elements 41 having conductors 21 partially embedded therein alternately spaced by insulative elongated elements 37, it should be understood that elongated insulative elements 37 may be eliminated such that conductors 21 are embedded in every adjacent elongated insulative element.

It should be noted that any insulative material capable of being softened and melted at elevated temperatures may be utilized to form the cable structure disclosed herein.

Turning to FIG. 3(*a*), it should be noted that conductors 21 make contact with the sloping sides of grooves 29 and therefore prevent the melted insulative material 11 from flowing past these contacting surfaces and keep the portion of conductors 21 between these contacting surfaces from being covered by insulative material. Therefore, except where conductors 21 pass through ribs 39, conductors 21 are partially exposed in elongated insulative elements 41 of FIG. 4.

Turning now to FIG. 4, the different lengths of lattice air spaces 43 and 45 allow insulative jackets 51, 47 and 55 of FIGS. 5(*a*) and 5(*b*) to be formed between elongated insulative elements 37. The shorter air spaces 45 allow air to be trapped between the insulative jackets 51 and 47 to produce a composite of air and insulative material to surround conductors 21 for the purposes of obtaining a composite dielectric constant which more nearly approaches that of air. At the same time, by periodically having longer air spaces 43, the insulative jackets 51 and 47 are allowed to merge into a uniform jacket 55 whereby the insulative jacket is mechanically attached to the lattice cable. By making the rib spacing configuration as illustrated in FIG. 4 such that the pattern illustrated occupies a fraction of the wave length of an electrical signal being propagated, the electrical signal experiences the average of the dielectric constant over the pattern dimension and, therefore, dielectric constants approaching that of air can be achieved.

Since layered cable structures of FIGS. 6 and 7 form transmission lines which lie in a plane substantially perpendicular to the plane of the flat cable lattice structure, the density of transmission lines can be increased without increasing cross-talk therebetween.

The mating "U" channel structure of FIG. 7 allows the dielectric constant of the cable to approach more closely the dielectric constant of air than any other structure excluding an open wire transmission line. This type of structure encapsulated with insulative jacket 85 of FIG. 8 reduces cross-talk to a minimum, with the assembly also being mechanically held together by the insulative jacket.

It is contemplated within the present invention to provide the ability to interconnect several crossing lattice cable structures by the offset conductor arrangement illustrated in FIG. 6. By having conductors 61 and 69 located in the corners of elongated insulative elements 59 and 67, respectively, another lattice cable structure similarly formed may be interconnected by extending connective pins through the openings in the lattice structure to connect one conductor of one cable structure with a corresponding conductor of the other cable structure.

It now should be apparent that the present invention provides a lattice cable structure having partially exposed conductive elements and a method for making the same which may be employed in conjunction with high frequency transmission lines and flat interconnecting cables for providing low cross-talk in high density transmission lines heretofore not possible.

Although particular components, etc., have been discussed in connection with a specific embodiment of a lattice cable structure and methods for making the same which embodiment was constructed in accordance with the teachings of the present invention, other components and steps may be utilized. Furthermore, it will be understood that although an exemplary embodiment of the present invention has been disclosed and discussed, other applications, methods and alternative mechanical arrangements are possible and that the embodiments disclosed may be subjected to various changes, modifications and substitutions without necessarily departing from the spirit of the invention.

What is claimed is:

1. A flexible lattice filament cable comprising:

a pair of elongated insulative elements extending parallel to one another and uniformly spaced apart by integrally formed insulative ribs therebetween, said elongated insulative elements and said insulative ribs having a first dielectric constant, and an elongated electrical conductor partially embedded in each of said elongated insulative element and completely embedded in said insulative ribs so that a portion of the surfaces of said electrical conductors is exposed.

2. The filament cable described in claim 1 wherein said elongated insulative elements and said integrally formed insulative ribs are surrounded with an insulative jacket having a second dielectric constant that is different from said first dielectric constant, and said surrounding insulative jacket contacting said insulative ribs to form enclosed air cavities between adjacent said insulative ribs so that the space between said electrical conductors along their lengths is a composite of the dielectric constant of air and of said first dielectric constant, thus providing a cross-talk reduction transmission line having a said composite dielectric constant between said electrical conductors.

3. A flexible lattice cable comprising:

a plurality of elongated insulative elements extending parallel to one another and uniformly spaced apart by integrally formed insulative ribs therebetween, and an elongated electrical conductor partially embedded into a common surface of at least every other one of said elongated insulative elements and completely embedded in said insulative ribs so that a portion of the surface of said electrical conductor is exposed for possible electrical contact.

4. The lattice cable described in claim 3 wherein at least one of said embedded electrical conductors is positioned off center in said insulative elements so that said exposed portions of said at least one electrical conductor are accessible for electrical contact from either side of said lattice cable through the lattice openings thereof.

5. A flexible lattice cable assembly comprising:

two of the lattice cables of claim 3 or 4 positioned so that said insulative elements of each of said lattice cables are in mating alignment and in contact along their surfaces opposite to said common plane surface containing said embedded electrical conductors, and said electrical conductors embedded in said aligned and contacting insulative elements are mated as a plurality of transmission line pairs, each of said pairs being in a plane substantially perpendicular to the plane of said contacting surfaces of said insulative elements.

6. A flexible lattice cable comprising:

a plurality of elongated insulative elements extending parallel to one another and uniformally spaced apart by integrally formed insulative ribs therebetween, said elongated insulative elements and said insulative ribs having a first dielectric constant, said insulative elements being formed as "U" shaped channels, and an elongated electrical conductor centrally located within each of said "U" shaped insulative elements and partially embedded therein and completely embedded in said insulative ribs so that a portion of the surface of said electrical conductor is exposed.

7. A flexible lattice cable assembly comprising:

two of the lattice cables of claim 6 positioned so that the open surfaces of said "U" shaped channels of said two cables are in mating alignment and confronting one another so as to form elongated enclosed air spaces within said mating channels, and said conductor embedded in each of said "U" channels of one of said two cables mating with a said conductor embedded in said "U" channels of the other to form a plurality of conductor pairs, each of said pairs being in a plane substantially perpendicular to the plane of said cable assembly, and said exposed surface of each of said paired conductors facing that of the other with said pairs separated by said enclosed air spaces thus providing a transmission line structure having a dielectric constant approaching that of air.

8. The lattice cable assembly of claim 7 further including an insulative jacket having a second dielectric constant that is different from said first dielectric constant that surrounds said cable assembly and extends into and through lattice openings thereof so as to join said two lattice cables, said jacket reducing cross-talk between said conductor pairs.

9. A method for making a lattice cable comprising the steps of:

applying heat to a film belt of insulative material having a first dielectric constant to melt said film belt;

heating a plurality of electrical conductors to a temperature that is near to the melting temperature of said film belt;

heating a mold roll to a temperature that is near to the melting temperature of said film belts;

moving said plurality of heated electrical conductors into seated contact with circumferential grooves in the surface of said mold roll so that at least every other one of said circumferential grooves receives one of said heated electrical conductors, said electrical conductors bridging longitudinal grooves in the surface of said mold roll, said longitudinal grooves having a depth greater than said circumferential groove and crossing said circumferential grooves at spaced intervals;

moving said melted film belt into pressure contact with said molding roll surface to mold said insulative material into said circumferential grooves and into said deeper longitudinal grooves thereby forming parallel elongated insulative elements with at least every other one thereof containing an electrical conductor partially exposed therein, said parallel elongated insulative elements being interconnected at spaced intervals by integrally formed insulative ribs surrounding said electrical conductors; and cooling said parallel elongated insulative elements and electrical conductors partially exposed therein along with said interconnecting ribs to solidify and stabilize the lattice cable structure.

* * * * *